United States Patent [19]

Dawson

[11] 4,022,604
[45] May 10, 1977

[54] APPARATUS FOR COOLING NEWLY FORMED GLASS CONTAINERS

[75] Inventor: Roy E. Dawson, Toledo, Ohio

[73] Assignee: Owens-Illinois, Inc., Toledo, Ohio

[22] Filed: May 20, 1976

[21] Appl. No.: 688,203

[52] U.S. Cl. .................................. 65/348; 65/17; 65/375; 65/374 R; 65/356; 137/544; 137/8; 138/41

[51] Int. Cl.² .................. C03B 27/00; E03B 3/18

[58] Field of Search ............ 65/17, 348, 375, 374, 65/356; 138/39, 38, 41, 42; 137/8, 544, 549, 550

[56] References Cited

UNITED STATES PATENTS

| | | | |
|---|---|---|---|
| 1,883,720 | 10/1932 | Grimes | 138/41 |
| 2,525,112 | 10/1950 | Baker | 65/348 X |
| 2,677,919 | 5/1954 | Worrest | 65/348 |
| 3,107,161 | 10/1963 | Bivens et al. | 65/348 X |
| 3,303,013 | 2/1967 | Mumford et al. | 65/348 X |
| 3,607,196 | 9/1971 | Garvey | 65/348 |
| 3,907,533 | 9/1975 | Jenkins | 65/17 |
| 3,960,173 | 6/1976 | Bickers | 137/550 |
| 3,964,519 | 6/1976 | Debaum | 138/41 X |

Primary Examiner—S. Leon Bashore
Assistant Examiner—Frank W. Miga
Attorney, Agent, or Firm—D. T. Innis; E. J. Holler

[57] ABSTRACT

In the cooling of newly formed glass containers, the containers are moved from blow molds and placed on what is termed a cooling "dead plate". The dead plate is supplied with air under pressure which is fed into the casting forming the dead plate. The ware sits on a generally flat, perforate member which is the cover for the dead plate casting. The air supply is found beneath the conveyor belt in the housing for supporting the conveyor for carrying the ware away from the forming machine. A plurality of openings, adjacent each ware forming position, are provided through the bottom of the conveyor housing and air within the housing will enter the underlying, horizontal leg of the dead plate casting whose upper surface has complementary openings to those in the conveyor housing and exit through the perforations in the dead plate to cool the ware sitting thereon. A honeycomb structure is provided in the air flow passages from the conveyor connection and also in the passage beneath the dead plate surface to effectively deaden the noise of air used for cooling the ware.

6 Claims, 6 Drawing Figures

APPARATUS FOR COOLING NEWLY FORMED GLASS CONTAINERS

BACKGROUND OF THE INVENTION

This invention relates to the cooling dead plate mechanism found on glass forming machines commonly termed or known as "I.S." machines. I.S. machines now are made with as many as 10 sections mounted side by side and each section is provided with a cooling dead plate. The dead plate for each machine is generally in substantially abutting relationship to a single conveyor common to all of the machines and running adjacent each of the sections.

The conveyor may be a moving belt-type conveyor, with the structure of the conveyor such that it has sidewalls serving as supports for the belt. It was found convenient to close the bottom of these sidewalls and thus provide an elongated, in effect, manifold for air under pressure with the air then being conveniently available to each of the dead plate mechanisms by providing openings in the bottom of the conveyor structure and corresponding openings in a horizontal leg of the casting which will carry the air from the conveyor support to the dead plates. It has become common to make the casting for the dead plate and its connections to the conveyor bottom as a single overall casting which is bolted to the bottom of the conveyor.

The air coming from the conveyor support may be at a pressure of 25 lbs./sq./in. and the individual openings in the bottom of the conveyor support may be four equal-size rectangular openings of about 1½ inches by 3 inches. Each opening is in registry with complementary openings formed in the mating surface of the horizontal leg of the dead plate casting.

When the air issues from the perforate dead plate to effect the cooling of the containers positioned thereon, it has sufficient velocity such that with the background noise of 85 dbA, it produces considerable noise of nearly 90 dbA.

SUMMARY OF THE INVENTION

A method of and apparatus for reducing the noise resulting from cooling air at the dead plate of a glass forming machine where air under pressure flowing from a conveyor channel through a compartmented casting is admitted through a perforate dead plate with means provided in the compartmented casting for reducing the turbulence of air flowing therethrough.

DETAILED DESCRIPTION OF THE DRAWINGS

Figure 1:
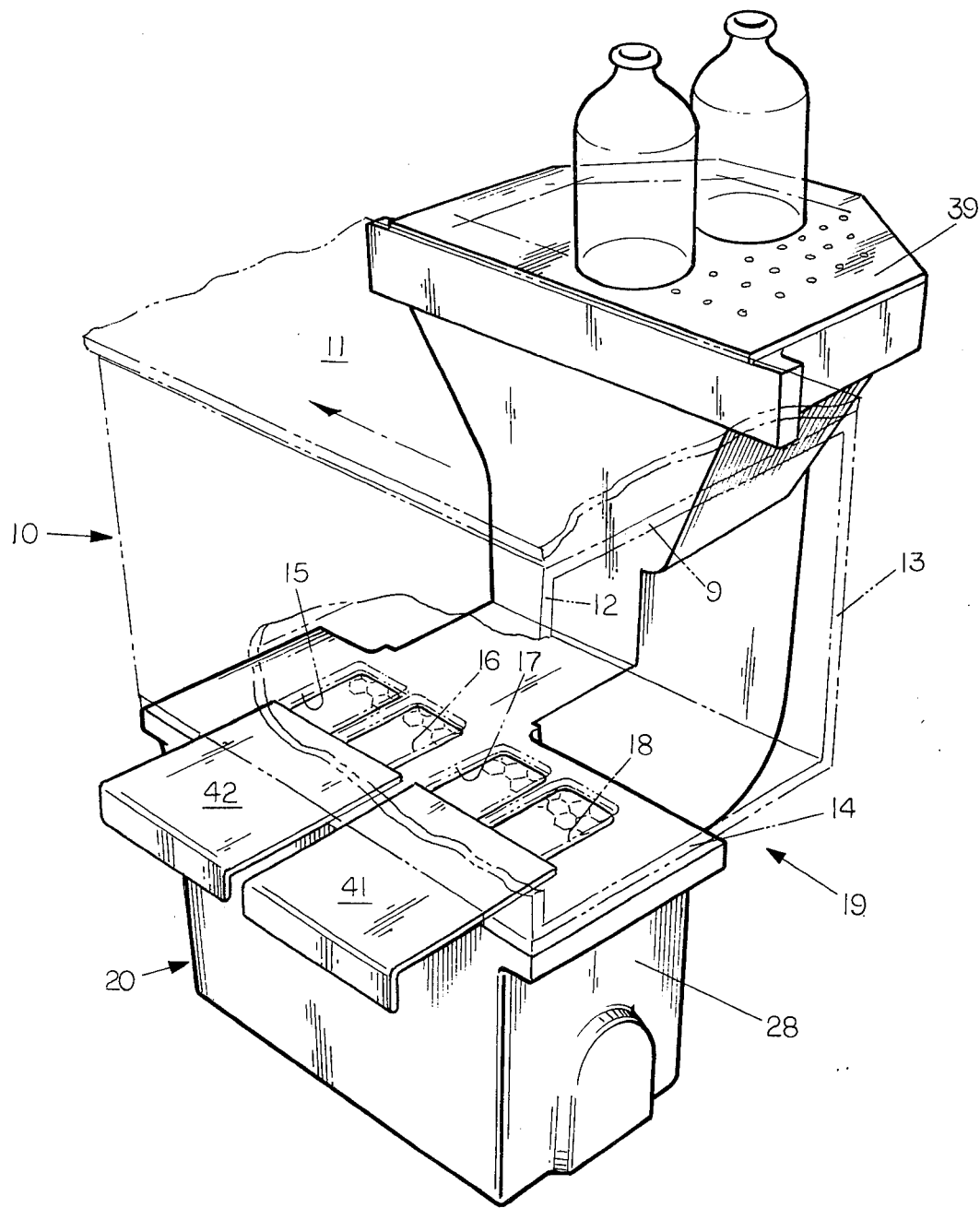
FIG. 1 is a perspective view of the general arrangement of the invention in conjunction with one independent section of a forming machine and the machine conveyor.

With particular reference to FIG. 1, there is shown a machine conveyor generally designated 10. The conveyor 10 has a moving belt 11 moving in the direction of the arrow thereon, with the belt being supported by a plate 9 carried by a pair of sidewalls 12 and 13. The bottom area between the sidewalls is closed by a plate 14 so that, in effect, the machine conveyor 10 becomes a manifold or tunnel extending beneath the conveyor belt for its full length, or at least to the extent that it is adjacent each of the take-out stations on the I.S. forming machine. Adjacent each take-out station, it being understood that the drawing illustrates merely one of a plurality of stations, the plate 14 has four openings 15, 16, 17 and 18 of a generally rectangular configuration.

Figure 3:
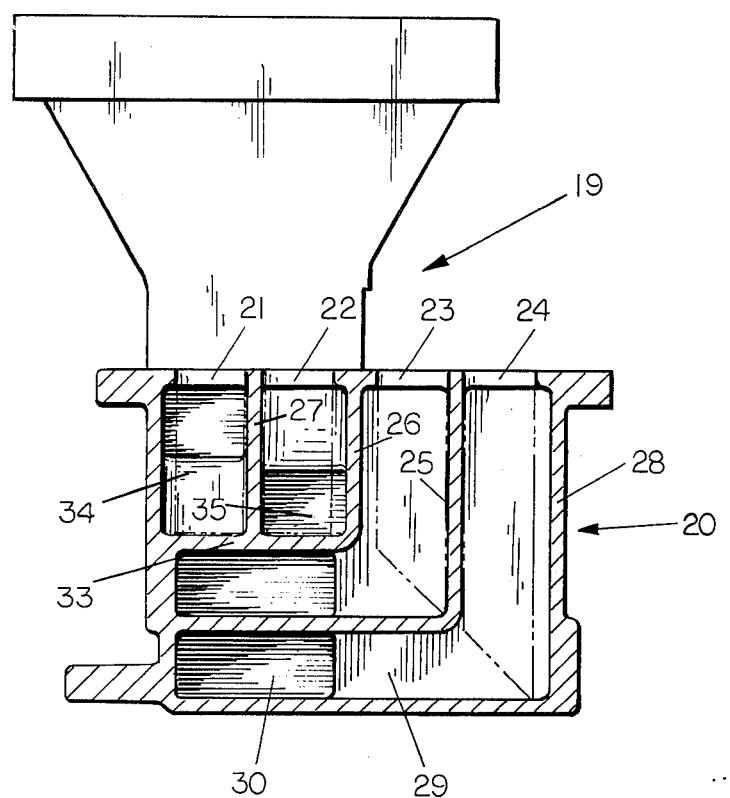
FIG. 3 is a cross-sectional view taken at line 3—3 of FIG. 2.

A generally L-shaped casting 19 has its lower leg 20 extending beneath the conveyor 10. The leg 20 has generally rectangular openings 21, 22, 23 and 24 formed therein which underlie and register with the openings 15-18 formed in the bottom plate 14 of conveyor 10. Within the leg 2 of the L-shaped casting 19, are a plurality of downwardly extending walls 25, 26 and 27 which divide the casting into four areas or passageways. As can best be seen when viewing Fig. 3, the walls 25, in conjunction with an outer wall 28, provides a passageway extending to the bottom of the casting. This passageway turns 90°, as well as does the wall 25, at a point above the bottom of the casting to form a generally horizontal channel 29 through which air may flow. The left-hand side of the channel 29, as viewed in FIG. 3, turns 90° in a horizontal direction opening into and forming a lower horizontal passage 30 which extends through the remaining portion of the lower leg of casting 19. Similarly, the opening 23 between the walls 25 and 26 extends downwardly in a position intermediate the bottom of the L-shaped casting 19 and turns 90° from the vertical to form a horizontal channel 31. The horizontal channel 31 connects to a horizontal passage 32 that extends parallel to and immediately above passage 30 through the lower portion of the leg 20 of the L-shaped casting 19.

The openings 22 and 21 in the top of the leg 20 extend vertically downward to essentially the same level as defined by a horizontal wall 33. It should be noted that the wall 33 also serves as the top of the passageway or channel 31. As can best be seen from FIG. 3, the wall 27 is vertical and divides the space beneath the two openings 21 and 22 into two rectangular chambers which extend to the wall 33. The chambers both open to the left, as viewed in FIGS. 2 and 4.

Figure 5:
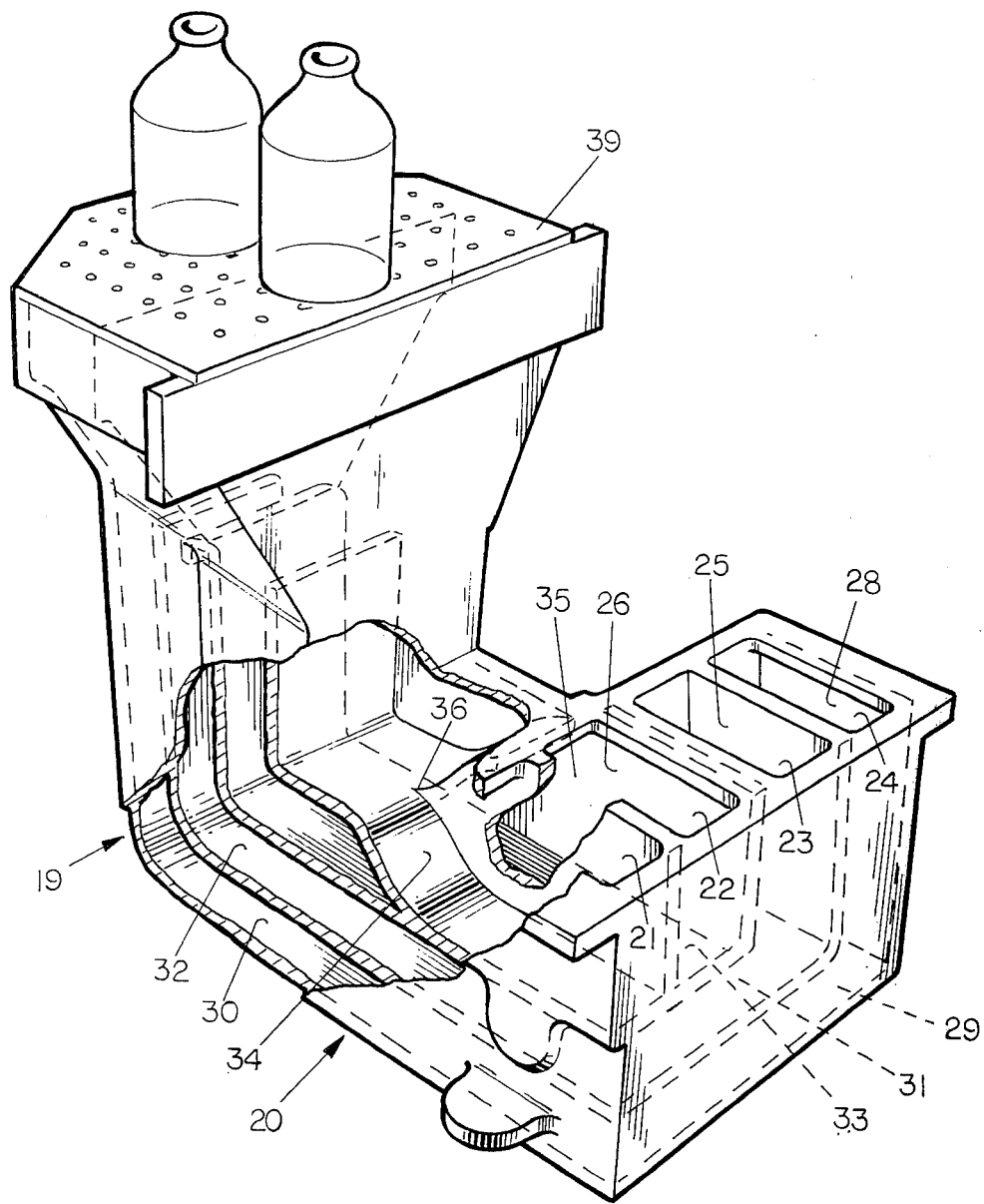
FIG. 5 is a perspective view of the apparatus of FIG. 2 with one wall broken away from viewing the interior thereof.

Looking to the left in FIG. 5, from directly beneath the left edge of openings 21 and 22, the wall 27 is shaped to gradually turn from the vertical to the horizontal at a point 36. In turning from vertical to horizontal, a pair of passages 34 and 35, whose entrances are rectangular, with the major axes vertical, will have their major axes turned 90° such that they will be essentially horizontal and these passages 34 and 35 communicate with a pair of passages 37 and 38 which extend vertically upward to just below a suitable cover plate 39 positioned over the vertical leg of the L-shaped casting 19. It will be noted that the machine conveyor generally designated 10, with its sidewalls 12 and 13 along with a bottom wall 40, is embraced within the height and length of the L-shaped casting 19.

Figure 2:
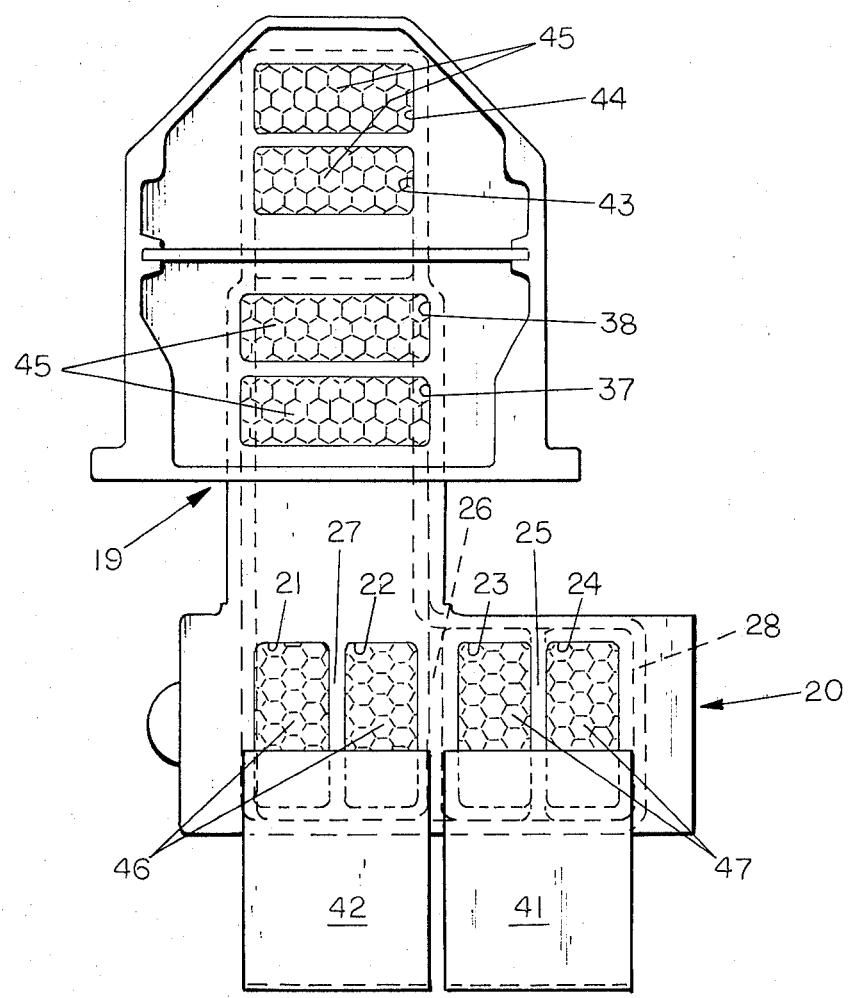
FIG. 2 is a top plan view of the dead plate casting with the perforate top plate removed.

In order to regulate, to a certain degree, the amount of air which is permitted to flow from the conveyor structure 10 into the top of the horizontal leg of the L-shaped casting 19, a pair of dampers 41 and 42 in the form of generally flat plates are slideably positioned so as to close of the selected portion of the openings 21 and 24 as desired. It should also be pointed out that the passages 30 and 32, which are below the passages 34 and 35, also turn through 90° and extend upwardly in the vertical leg of the L-shaped casting 19 and at their upper ends define passages 43 and 44, as best seen in FIG. 2.

Figure 4:
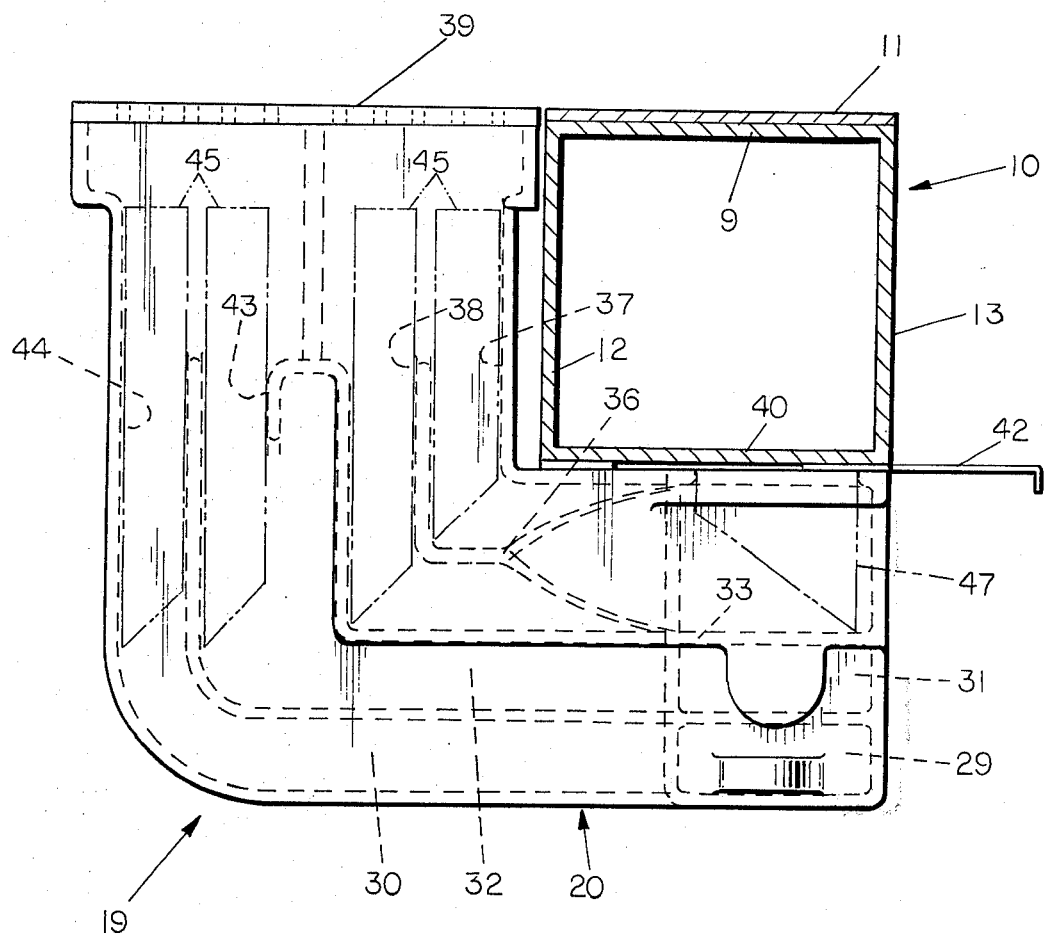
FIG. 4 is a side elevational view of the apparatus of FIG. 2.
Figure 6:
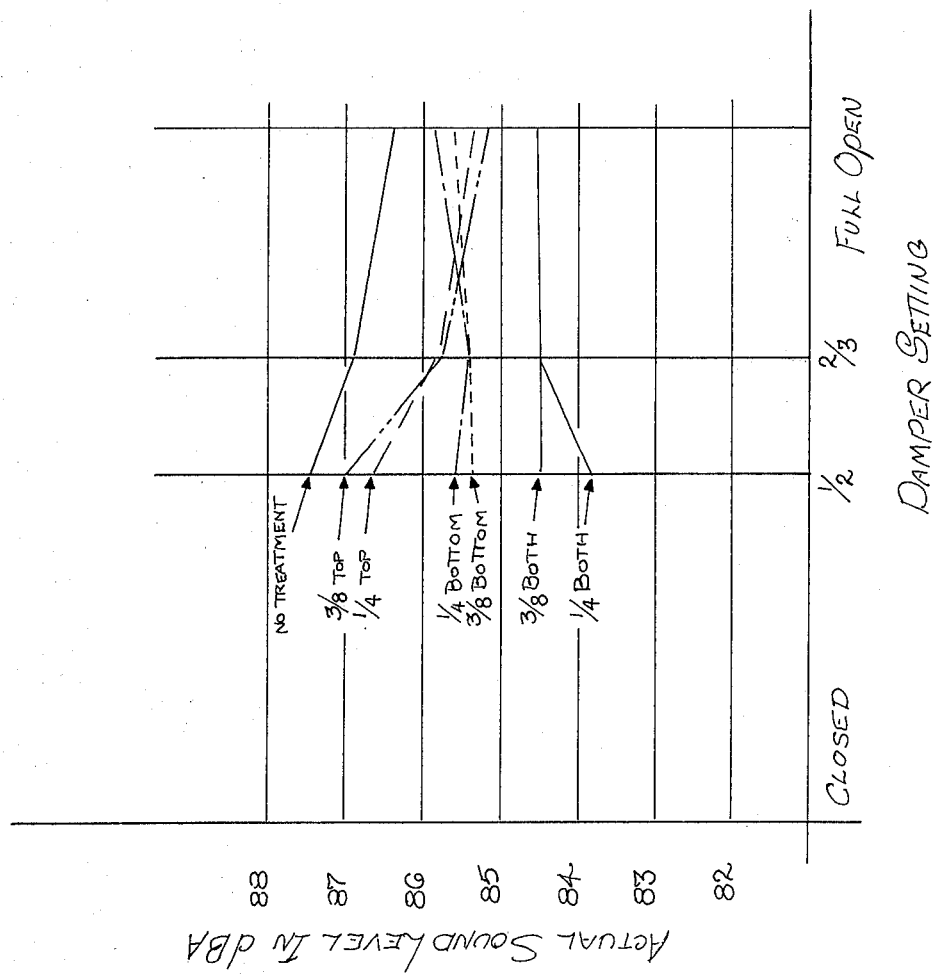
FIG. 6 is a noise level vs. slide damper setting diagram for several conditions.

Extending downwardly within the passages 37, 38, 43 and 44 are laminar flow-directing members 45 having a generally vertical honeycomb configuraton, there being a member 45 in each of the passages 37, 38, 43 and 44. The laminar flow-directing members 45 have a cross-sectional configuration in the form of open hexagons, as can best be seen in FIG. 2, and extend downwardly forming vertical channels which are parallel to the direction of flow of the air with their lower ends cut at approximately a 45° angle adjacent a point where the passages bend at right angles into horizontal passages. These laminar flow-directing members 45 are made of aluminum material and are sold under the trade name HEXCEL. This material is sold by the Hexcel Corporation in at least two sizes where the hexagons are 3/8ths of an inch and a 1/4 inch in diameter. In addition, the same material is used to make members 46 which extend vertically downward through the openings or passages 24 and 23. Similary, but in a slightly different configuration, members 47 extend downwardly and are cut at an angle, as best shown in FIG. 4, within the openings or passages 21 and 22. In this manner laminar flow of the cooling air is produced by the honeycomb material 45 with the hexagonal cross-section material extending parallel to the direction of air flow within the upper passages and material 46 and 47 within the lower passages. Inducing laminar flow in these two areas has the effect of deadening the sound produced by air flowing through the passages. FIG. 6, which is a sound level v. damper setting for several conditions of acoustic treatments, illustrates the effect of using the HEXCEL material. The readings that were taken, and from which the curve or graph shown in FIG. 6 was made, involved the positioning of a noise meter at approximately 28 inches above the center of the perforate, material dead plate.

The air being delivered to the machine section at the time was measured at about 25.5 inches of water pressure. The noise measurements were first taken without any HEXCEL material and then were taken with ¼ inch of ⅛ths inch honeycomb HEXCEL material in the top only and the bottom only of the dead plate casting 19. A second set of readings was taken with the two sizes of material in both the top and bottom areas of the casting 19. Note also that the degree of opening of the dampers 41 and 42 is also a factor in the measurements. A standard transite pad was used on the top, it being understood that the transite pad has a plurality of holes drilled therethrough in a pattern which is selected with regard to particular shapes and sizes of ware being produced by the machine section.

Actual noise level readings in dbA were taken under the various conditions and are set forth in the following table:

| Condition | Damper Setting Full Open Ave. | Full Open Range | ⅓ Closed Ave. | ⅓ Closed Range | ½ Closed Ave. | ½ Closed Range |
|---|---|---|---|---|---|---|
| Plain dead plate (corrected) | 89.0 86.4 | 88.7–89.3 | 89.3 86.9 | 89.2–89.4 | 89.7 87.5 | 89.5–90.0 |
| ¼" Only in top (corrected) | 88.5 85.4 | 88.2–88.7 | 88.7 85.8 | 88.5–89.0 | 89.2 86.7 | 89.0–89.4 |
| ¼" only in Bottom (corrected) | 88.7 85.8 | 88.5–88.9 | 88.5 85.4 | 88.3–88.7 | 88.6 85.6 | 88.4–88.8 |
| ¼" in both (corrected) | 88.1 84.5 | 87.9–88.3 | 88.1 84.5 | 87.9–88.3 | 87.8 83.8 | 87.6–88.0 |
| ⅜" in top (corrected) | 88.4 85.2 | 88.2–88.6 | 88.7 85.8 | 88.5–88.9 | 89.4 87.0 | 89.2–89.6 |
| ⅜" in bottom (corrected) | 88.6 85.6 | 88.4–88.8 | 88.5 85.4 | 88.3–88.7 | 88.5 85.4 | 88.3–88.8 |
| ⅜" in both (corrected) | 88.1 84.5 | 87.9–88.3 | 88.1 84.5 | 87.8–88.3 | 88.1 84.5 | 87.8–88.3 |

The background noise level was measured prior to turning on the cooling air and was found to be 85.7 dbA.

The "A" notation with the decibel readings indicates that the measurements were made with the "A network" since such measurements would be more nearly indicative of aural evaluation of the sound at a distant point.

The average readings in dbA were corrected for ambient background level in accordance with a correction curve that is found in Section 17, page 7, of the "Handbook of Noise Control", Edited by Cyril M. Harris and published by McGraw-Hill in 1957.

The corrected average readings are those that have been used to form the graph shown in FIG. 6.

From the foregoing data and in view of FIG. 6, it can be seen that the use of the honeycomb material in either the upper or "top" part of the casting 19, in the bottom part of the casting or in both parts simultaneously significantly reduces the noise level in the immediate vicinity of the dead plate at various flow volumes of cooling air.

While the foregoing description is relatively specific with regard to the materials used to induce laminar flow in the selected areas of the dead plate casting that are most accessible, it should be kept in mind that other materials that induce laminar or non-turbulent flow and which do not significantly reduce the volume of cooling air available would be likewise beneficial in reducing the noise level. Obviously, the availability of sufficient air flow volume is a necessary criteria to the successful operation of the cooling dead plate.

I claim:

1. In apparatus for cooling newly formed glass containers that are placed on a dead plate prior to being swept onto a moving conveyor, comprising:
    said conveyor being formed of two elongated, spaced-apart sidewalls and upper plate with a belt supported thereby;
    means closing the lower gap between the conveyor sidewalls, thereby forming a tunnel beneath the conveyor belt;
    a generally L-shaped, hollow casting having the horizontal leg of said casting underlying the conveyor;
    a plurality of discrete openings formed in the bottom of said tunnel communicating with passages in said casting;
    means supplying air under pressure to said tunnel;

a plurality of individual passages in said casting extending first downwardly then horizontally and finally vertically upward;

a perforate dead plate for supporting the glass containers, overlying the upper end of said casting; and channel means supported in said passages for reducing the turbulence of the air flowing therethrough, whereby the noise level is reduced at a position above the apparatus.

2. The apparatus of claim 1 wherein said turbulence reducing channel means comprises a vertical honeycomb material filling the vertical portions of the passages.

3. The apparatus of claim 2 wherein said honeycomb material is hexagonal in section.

4. The apparatus of claim 3 wherein said material has an opening size in the range of 0.125 to .5 inches.

5. The apparatus of claim 3 wherein said material has openings in size range of 0.25 inches to 0.375 inches.

6. The apparatus of claim 1 wherein said turbulence reducing channel means comprises a first elongated honeycomb material, positioned in the straight portions of said passages in said casting below the dead plate and a second elongated honeycomb material in the passages in said casting immediately below the conveyor.

* * * * *